United States Patent
Osborne

[19]
[11] Patent Number: 5,865,060
[45] Date of Patent: Feb. 2, 1999

[54] INTERCONNECTING MECHANISM

[76] Inventor: Graham William Osborne, 74 Yarmouth Road, North Walsham, Norfolk NR28 9AU, England

[21] Appl. No.: 875,456
[22] PCT Filed: Jan. 31, 1996
[86] PCT No.: PCT/GB96/00211
  § 371 Date: Jul. 28, 1997
  § 102(e) Date: Jul. 28, 1997
[87] PCT Pub. No.: WO96/23991
  PCT Pub. Date: Aug. 8, 1996

[30] Foreign Application Priority Data

Jan. 31, 1995 [GB] United Kingdom ............... 9501869
May 9, 1995 [GB] United Kingdom ............... 9509340

[51] Int. Cl.[6] .................................................. F16H 21/36
[52] U.S. Cl. ............................. 74/49; 74/570; 123/197.4
[58] Field of Search ................................. 74/49, 471 R, 74/570; 123/55.5, 55.7, 197.4

[56] References Cited

U.S. PATENT DOCUMENTS

| 2,506,110 | 5/1950 | Rzepela ................................. 74/49 |
| 4,173,151 | 11/1979 | Grundy ................................. 74/49 |
| 4,850,313 | 7/1989 | Gibbons ............................... 123/55 |
| 5,158,046 | 10/1992 | Rucker ............................... 123/197.4 |
| 5,503,038 | 4/1996 | Aquino et al. ....................... 74/49 |

FOREIGN PATENT DOCUMENTS

| 1747777 | 7/1992 | U.S.S.R. ............................. 74/49 |
| 93/18319 | 9/1993 | WIPO .................................. 74/49 |

Primary Examiner—Rodney H. Bonck
Assistant Examiner—William C. Joyce
Attorney, Agent, or Firm—Andrus, Sceales, Starke & Sawall

[57] ABSTRACT

A mechanism for interconnecting a rotary component (40) and two members (25, 26) linearly reciprocable at 90° to each other in respective bores (16, 18, 17, 19) in a housing (15). The first rotary component (40) has a shaft (41) with a pair of spaced toothed rings (42, 43). A second rotary component (44) has a bore (37) with internal teeth (45, 46) at the two ends thereof. The first rotary component (40) extends through the bore (37) with the respective teeth of the two components meshing. The second rotary component has external first and second eccentric surfaces (37 and 38), 180° out of phase. Each reciprocable member (25) has a pair of spaced-apart pistons (26, 27) with a web (28) extending therebetween, the web having a bore (29) in which is received the first (or second) eccentric surface (38 or 39). In operation, the first and second rotary components (32 and 36) rotate in the same sense, and the first and second members (25) reciprocate linearly 90° out of phase with each other.

12 Claims, 6 Drawing Sheets

INTERCONNECTING MECHANISM

This invention relates to a mechanism for interconnecting a rotary component and at least one linearly reciprocable member.

There has been a great number of proposals for mechanisms arranged to interconnect a rotary component and at least one linearly reciprocable member, whereby rotation of the component causes the member to reciprocate, or reciprocation of the member causes the component to rotate. The simplest of such mechanisms comprises a rotatable crank linked by a connecting rod to the reciprocable member which, in the case of a reciprocating piston engine or pump, comprises a piston sliding within a cylinder. The connecting rod is journalled one end to the crank and at its other end to the piston, or to a piston rod in turn connected to the piston. Such an arrangement is very widely employed, but has the disadvantage that the piston movement is a complex function of connecting rod length; the piston movement is only truly sinusoidal with a connecting rod of infinite length.

An alternative interconnecting mechanism comprises an eccentric device. Here, a disc (the "eccentric") is mounted eccentrically on a shaft and an eccentric strap fits slidingly therearound, the eccentric strap being linked to the reciprocable member by a connecting rod rigidly secured at one end to that strap. Movement of the member again is only truly sinusoidal with an infinitely long connecting rod.

True sinusoidal member reciprocation may be achieved with a mechanism including rotatable component having a pin which follows a circular locus and running in a slot provided in the reciprocable member, with the slot extending at right angles to both the direction of reciprocation and axis of rotation. It is however difficult to manufacture such a mechanism without introducing relatively large clearances and so significant backlash. Though there are innumerable other mechanisms for linking a rotatable component and a reciprocable member, mention here may be made of the Maltese Cross mechanism, wherein up to four reciprocable members, arranged in a cross-like formation, are caused to reciprocate by means of a respective pin on each member engaging in a curved cam surface formed on the rotatable component. Such a mechanism does not smoothly and continuously drive the reciprocable members and can be operated only relatively slowly.

The present invention aims at providing an interconnecting mechanism for at least one linearly reciprocable member, but possibly up to four such members, which mechanism may be smoothly-operating and have a predictable function for the linear movement of the or each reciprocable member relative to component rotation.

According to the present invention, there is provided a mechanism for interconnecting a rotary component and at least one linearly reciprocable member, which mechanism comprises;
  a first rotary component including an external toothed surface;
  a second rotary component including an internally-toothed bore and an external eccentric surface off-centre with respect to the axis of the bore, the toothed surface of the first rotary component being rotatably received within said bore with the respective teeth meshed;
  a first reciprocable member having a bore in which is rotatably received the external eccentric surface; and
  means to constrain movement of the first reciprocable member along a linear path normal to the axis of the first rotary component.

The mechanism of this invention may be regarded as a kind of double-eccentric mechanism, the first eccentric being defined by the first rotary component and the second rotary component which orbits therearound. The second rotary component has at least one but preferably pair of second eccentrics mounted thereon, which are directly coupled to at least one but preferably a pair of reciprocable members, whereby rotation of the first rotary component in one sense causes rotation of the second rotary component therearound, in the same sense, and the action of both rotary components causes linear sliding movement of the or each reciprocable member. Conversely, reciprocation of the or each reciprocable member will cause rotation of both the second and first rotary components, whereby a rotary output is obtained from the first rotary component of mechanism.

The eccentricity of the second rotary component with respect to the first rotary component (i.e. its "throw") and also the eccentricity of the or each eccentric surface of the second rotary component should be the same. In this way, the stroke of the or each reciprocable member will be equal to four times that eccentricity (or throw). This is because in one extreme position of a reciprocable member, the eccentricities of the first and second rotary components are aligned and additive, and at the other extreme of travel of the reciprocable member, the eccentricities are again aligned and additive but in the opposite sense. These positions correspond to rotation of the first rotary component through 180°. At the intermediate 90° and 270° positions of the first rotary component, the eccentricities of the first and second rotary components are aligned, but subtractive; in these positions, the geometric centre of the bore of the first reciprocable member lies on the axis of rotation of the first rotary component.

In a preferred form of this invention, there is a further rotary component mounted for rotation about the axis of rotation of the first rotary component, the further rotary component having an external first eccentric surface arranged eccentrically with respect to the axis of rotation of the first rotary component. In this arrangement, the bore in the second rotary component has a non-toothed portion in which is rotatably received the external first eccentric surface of the further rotary component, the eccentricity of the first eccentric surface being essentially the same as the eccentricity of the epicyclic movement of the teeth of the second rotary component about the toothed surface of the first rotary component.

The first reciprocable member may include a piston slidably arranged within a cylinder. Most preferably, however, the first reciprocable member has two pistons arranged one to each side respectively of the bore in that member, each of which pistons slides in an associated cylinder, the two cylinders being arranged co-axially. In either case, the reciprocable member is constrained to follow a linear path by the cylinder.

The second reciprocable member may be configured similarly to the first reciprocable member and thus may include a pair of pistons, one to each side respectively of the bore in the second reciprocable member, and arranged for sliding movement in a pair of associated cylinders, arranged co-axially. These cylinders will have their common axis at right angles to the axis of the cylinders of the first reciprocable member. In order to allow the construction of such a mechanism, the first and second external further eccentric surfaces must be spaced axially on the second rotary component. Preferably, the axes of the associated cylinders are similarly displaced along the axis of the first rotary component, though it would be possible to arrange for the cylinder axes to be in the same plane, with the pistons offset with respect to the respective reciprocable members.

In a preferred construction, the mechanism includes a body in which are formed the respective cylinders and the first rotary component includes a shaft on which the first eccentric surface is provided, the shaft being rotatably mounted in the body. The first and second reciprocable members each may comprise a pair of spaced pistons with a connecting web extending therebetween, the bore for the second eccentric surface being formed in that web. In this way, a particularly compact mechanism may be constructed, wherein the movement of each piston is truly sinusoidal, with respect to angular displacement of the first rotary component.

By way of example only, two specific embodiments of interconnecting mechanism constructed and arranged in accordance with the present invention will now be described in detail, reference being made to the accompanying drawings, in which.

The first embodiment of interconnecting mechanism of this invention, as shown in FIGS. 1 to 11, comprises a body 15 which defines four cylinders 16, 17, 18 and 19 arranged in two coaxial pairs 16,18 and 17,19. The axis 20 of cylinders 16,18 extends in a direction normal to axis 21 of cylinders 17,19 and is displaced laterally with respect thereto. The body 15 also defines a pair of journals 22 and 23 the common axis 24 of which extends mutually at right angles to axes 20 and 21, both of which axes intersect axis 24.

A first reciprocable member 25 (see particularly FIGS. 4A, 4B and 4C) has a pair of pistons 26,27 rigidly interconnected by means of a web 28. A bore 29 is formed through the web 28, midway between the pistons 26,27, the bore axis intersecting the common axis of the pistons. The first reciprocable member 25 is mounted in the body 15, with the pistons 26,27 slidingly received in the cylinders 16,18 whereby the first reciprocable member is constrained for sliding movement along axis 20. A second reciprocable member 30 is similarly configured to the first reciprocable member and is mounted in the body 15 with its pistons arranged for sliding movement in cylinders 17 and 19 respectively. By virtue of the relatively narrow webs of the reciprocable members, those members may perform simultaneous reciprocation with a limited stroke.

A first rotary component 40 (FIGS. 5A and 5B) comprises a shaft 41 having a pair of external toothed rings 42,43, spaced axially thereon. The shaft 40 is carried in the journals 22,23, whereby the toothed rings may rotate within the body 15.

A second rotary component 44 (FIGS. 6A, 6B and 6C) has a bore 37 with two sets of internal teeth 45,46 formed at opposite ends thereof. The teeth 45,46 engage the toothed rings 42,43 when the mechanism is assembled as shown in FIG. 1.

As such, the second rotary component 44 may rotate eccentrically around the shaft 40, with the teeth 42,45 and 43,46 meshing and forming an internal epicyclic gear train. This mechanism has an effective eccentricity defined by the spacing of the axes of shaft 40 and bore 37, when the two sets of teeth mesh.

The second rotary component defines two external eccentrics 38 and 39, arranged with their respective throws 180° out-of-phase. The eccentricities of these two further eccentrics 38 and 39 are each equal to the eccentricity of the second rotary component 44 with respect to the first rotary component 40, as described above. The axial spacing of the two further eccentrics 38 and 39 is equal to the separation of the axes 20 and 21 of the cylinders in the body 15.

Figure 1:
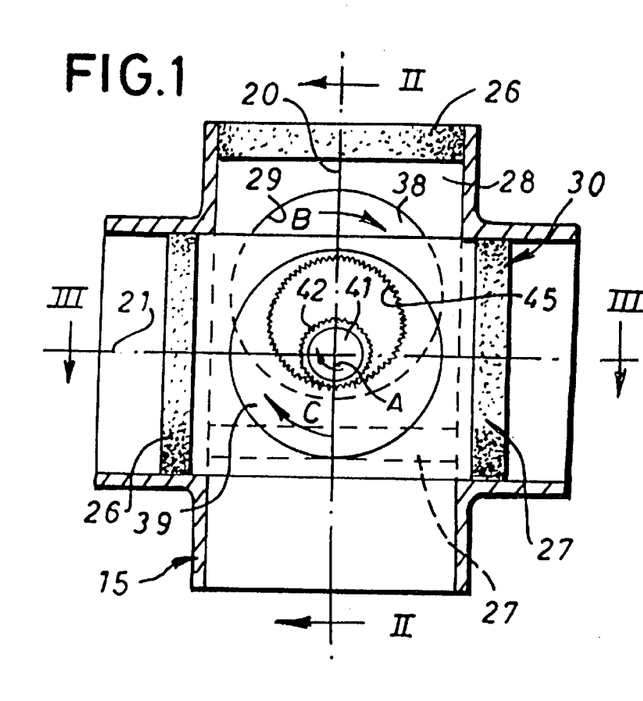
FIG. 1 is a diagrammatic cross-sectional view through the mechanism, on the axis of the first rotary component.
Figure 2:
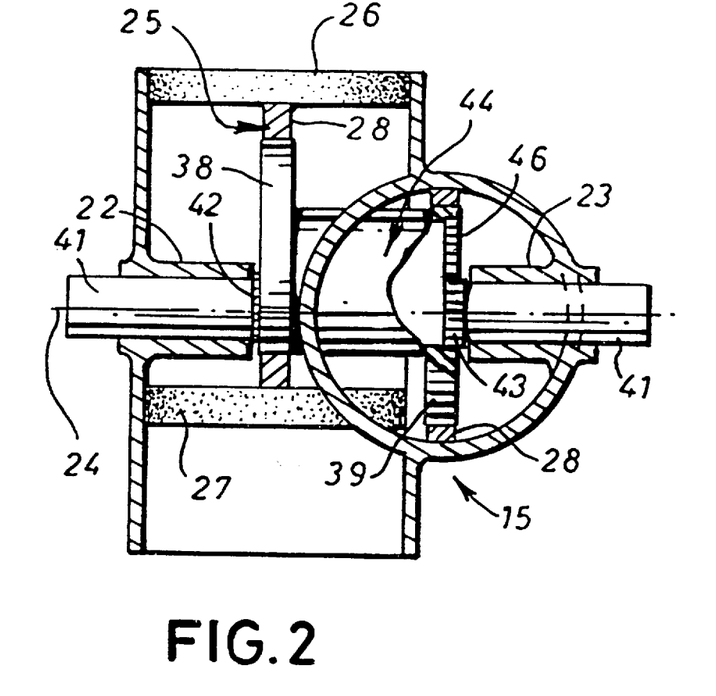
FIGS. 2 and 3 are diagrammatic sectional views of the mechanism, taken respectively on lines II—II and III—III marked on FIG. 1.
Figure 3:
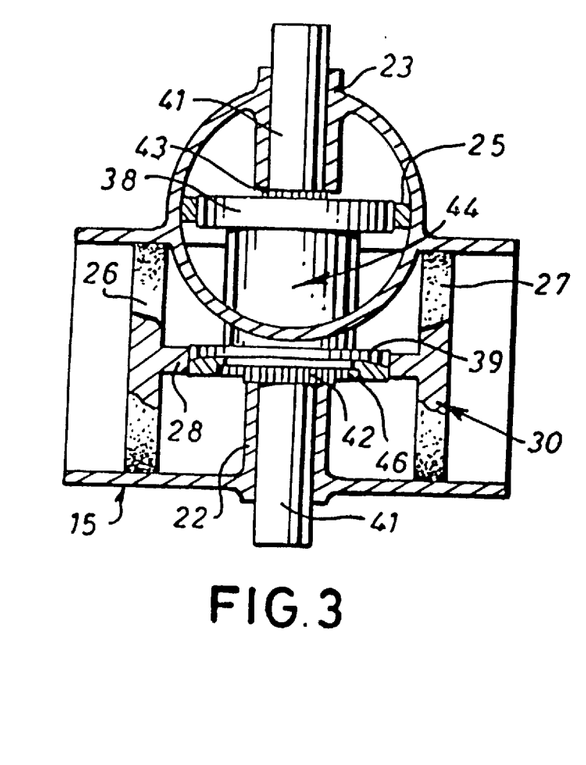
Figures 4A, 4B, 4C:
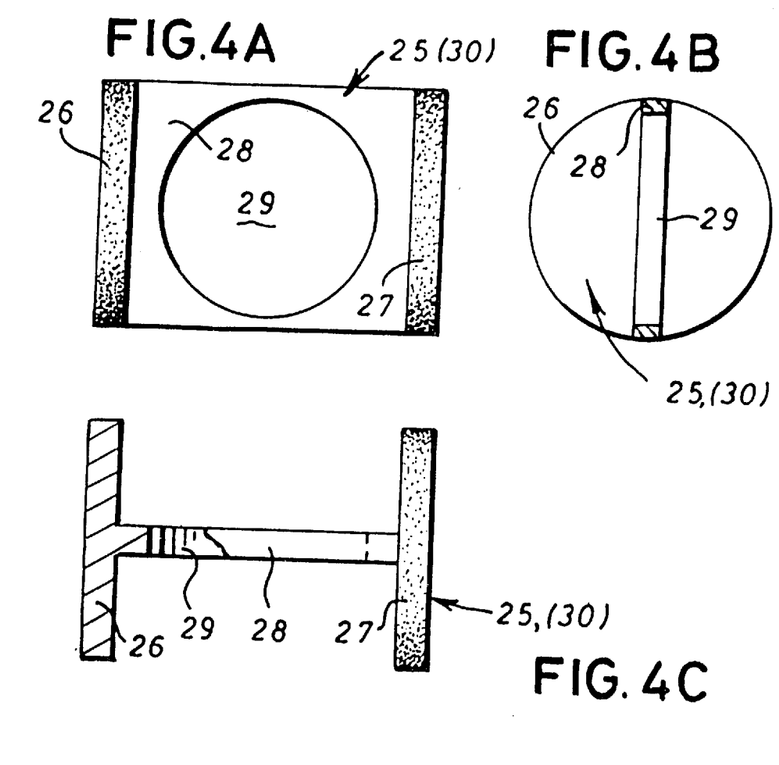
FIGS. 4A, 4B and 4C are respectively plan, end and side views of the first reciprocable member used in the mechanism, the second reciprocable member corresponding.
Figure 5A:
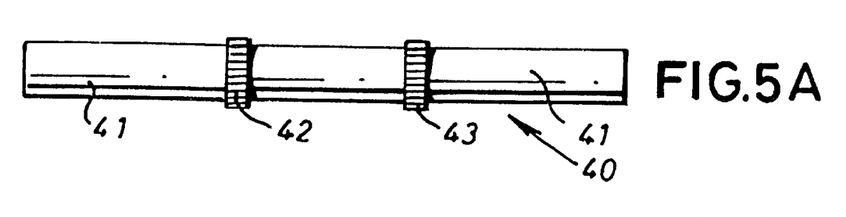
FIGS. 5A and 5B are respectively side and end views of the first rotary component.
Figure 5B:
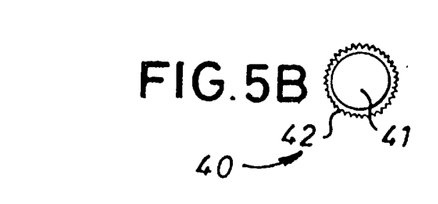

When fully assembled as shown in FIG. 1, the shaft 41 is carried in journals 22 and 23 of the body; the teeth 45,46 mesh with toothed rings 42,43 respectively; and the two further eccentrics 38 and 39 are respectively received in the bores 29 of the first and second reciprocable member 25 and 30. FIG. 1 shows the second reciprocable member 30 at one (upper, in the drawing) extreme of its travel in cylinders 17 and 19, with the first reciprocable member 25 at precisely the mid-point of its travel, between its two extremes, in cylinders 16 and 18. In this position, the eccentricities of the second rotary component and of eccentric 38 are aligned and additive in the direction of axis 21; and the eccentricities of the second rotary component and eccentric 39 are also aligned but subtractive in that same direction, and so the axis of eccentric 39 lies on axis 20, of cylinders 16 and 18. The first reciprocable member 25 is thus at its mid position.

The second rotary component 44 is positively located within the body 15 by virtue of the bores 29 in the first and second reciprocable members 25 and 30. The diameter of the toothed rings 42 and 43, and of the internal teeth 45,46 are chosen such that as the second rotary component 44 performs its epicyclic motion around the axis of the first rotary component 40, the teeth always remain meshed. Thus, as the second rotary component rotates around the axis of the first rotary component, drive will be imparted from the first rotary component to the second rotary component (presuming that the first rotary component is being driven), or the first rotary component will be driven by the second rotary component (in the case where the first and second reciprocable members 25 and 30 are being driven).

Starting from the position shown in FIG. 1, the shaft 41 of the first rotary component 40 may be turned in a clockwise direction as illustrated by arrow A, in which case the second rotary component rotates in the clockwise direction, arrows B and C showing the rotations of the further eccentrics 38 and 39 respectively. From that starting position, FIG.

Figures 8, 9, 10, 11:
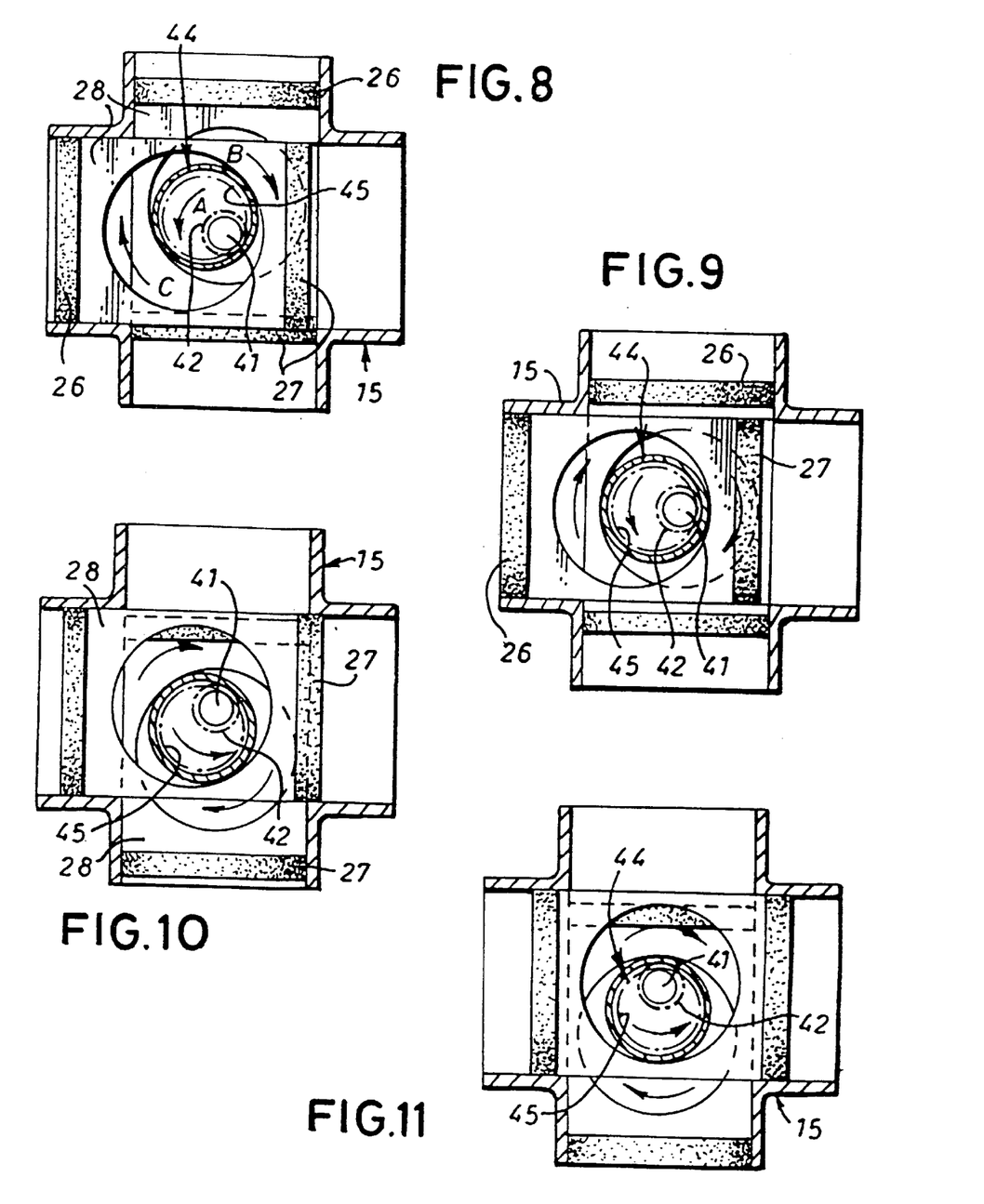
FIGS. 8, 9, 10 and 11 show further positions for the mechanism, starting from the position shown in FIG. 1, to a position where the first rotary component (FIGS. 5A and 5B) has turned through 180°.

8 shows an intermediate position and FIG. 9 the position with the first rotary component 40 turned through 90°. Here, the first reciprocable member 25 is at its extreme leftward movement and the second reciprocable member 30 is at its mid-position, with the respective eccentrics now being aligned along axis 20. Continued counter-clockwise rotation of the first rotary component 40, in the direction of arrow A, results in the components passing through the relative positions shown in FIG. 10 to the position shown in FIG. 11, where the eccentrics are once more aligned along axis 21, but this time with the second reciprocable member 30 at its other extreme (lower, in the drawing) position. Again, the first reciprocable member 25 is at its mid-position. From there, continued rotation of the first rotary component 40 eventually takes the various parts back to the position shown in FIG. 1.

Though described above as rotation of shaft 41 producing reciprocating movement of the pistons 26 and 27 of the first and second reciprocable members 25 and 30, it will be appreciated that the mechanism may operate in the opposite sense—that is to say, the pistons of the reciprocable members may be driven, and the shaft 41 will then be rotated.

FIGS. 12 to 15 show a modification of the mechanism described above. Here, a toothed sleeve 55 (FIG. 12) is rotatably mounted on a shaft 54 carrying an eccentric 52 (FIG. 13), to replace the first rotary component 40 of the first embodiment.

Component 50 (FIGS. 13A and 13B) has a first shaft part 51 on which is mounted the eccentric 52, having a cut-away circular portion 53 at one end thereof, co-axial with shaft part 51. Projecting co-axially from the end of the eccentric 52 opposed to shaft part 51 is a further shaft part 54, of a smaller diameter than shaft part 51. Rotatably mounted on that shaft part 54 is the toothed sleeve 55 (FIGS. 16A and 16B), having at one end a toothed ring 56. This ring is rotatably received within the cut-away portion 53, when sleeve 55 is located on shaft part 54. The outer diameter of the sleeve corresponds to the diameter of shaft part 51.

Figure 6A:
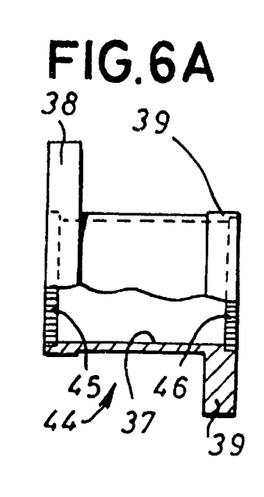
FIGS. 6A, 6B and 6C are respectively a side view, a further side view at 90° to FIG. 6A, and an end view of the second rotary component.
Figure 6B:
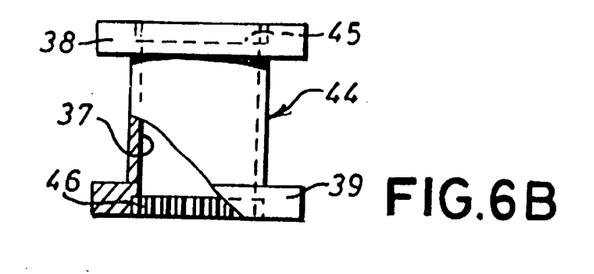
Figure 6C:
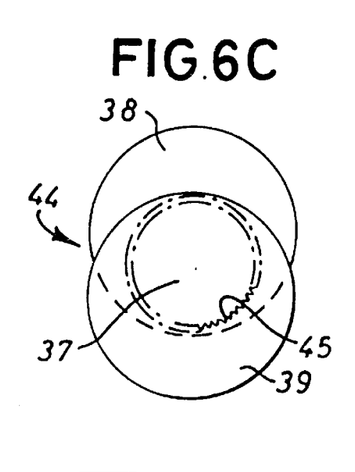
Figures 7A, 7B:
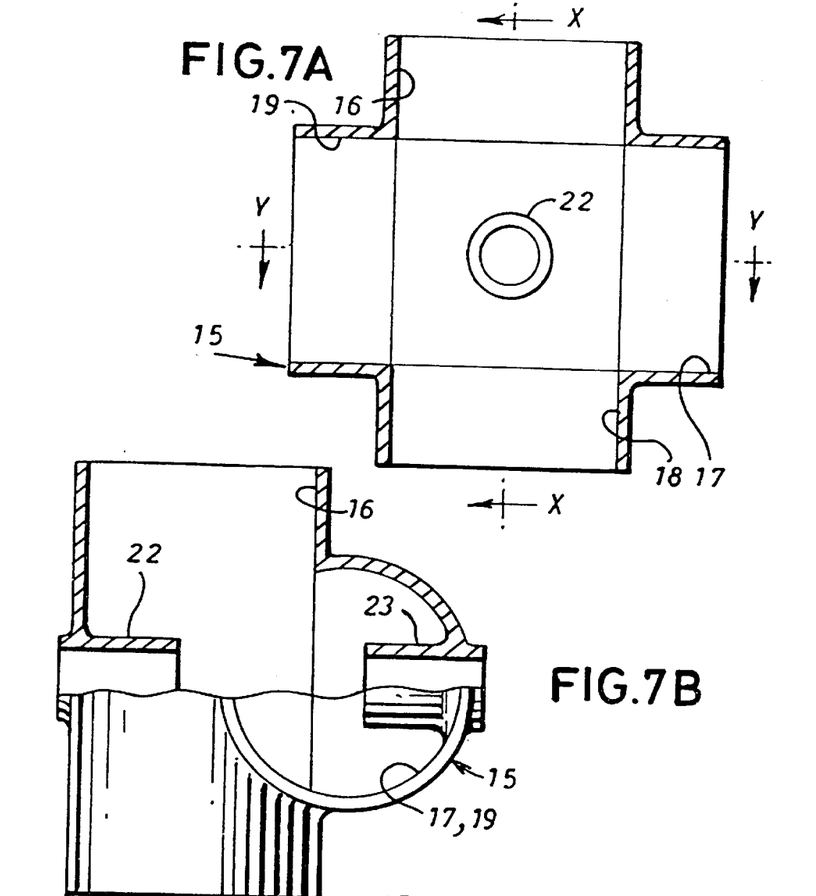
FIGS. 7A, 7B and 7C are respectively a cross-section through the body component and sections on lines X—X and Y—Y marked on FIG. 7A.
Figure 7C:
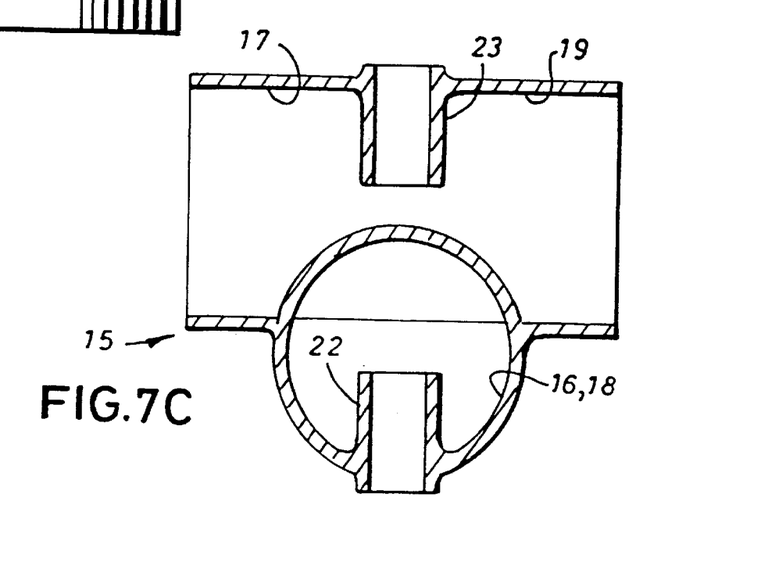

The compound first rotary component 50 and 55 is used with a second rotary component corresponding to that illustrated in FIGS. 6A, 6B and 6C, except that there is no need to provide internal teeth at both ends of the bore 37; internal teeth need be provided only at the end of the second rotary component for engagement with the toothed ring 56. The bore 37 of the second rotary component should be of such a size that the eccentric 52 is a running fit therewithin.

Figures 12A, 12B, 13A, 13B, 14, 15:
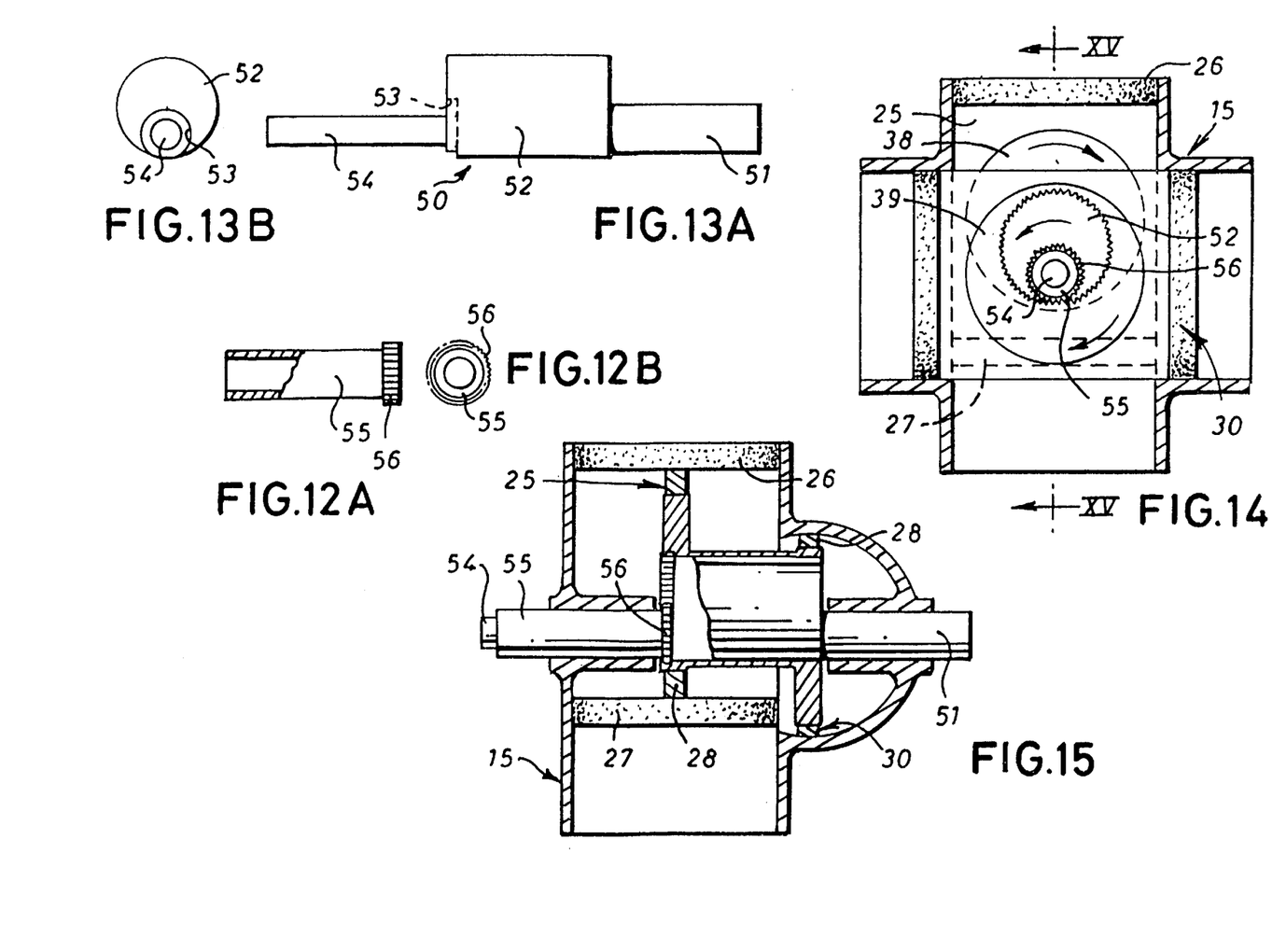
FIGS. 12A and 12B are side and end views of an first rotary component.
FIGS. 13A and 13B are side and end views of a further rotary component for use with the first rotary component of FIGS. 12A and 12B.
FIGS. 14 and 15 are diagrammatic cross-sectional views through the second alternative form of the mechanism, respectively on the axis of the first rotary component and on line XV—XV marked on FIG. 14.

The assembled mechanism utilising the first and further rotary components 50 and 55 is shown in FIGS. 14 and 15. The operation of this mechanism is exactly the same as has been described above insofar as the piston movements, second rotary component movement and toothed sleeve are concerned. However, the eccentric 52 serves positively to locate the position of the second rotary component, at any given instant, with the eccentric 52 rotating with its shaft part 51 in the opposite sense to toothed sleeve 55. Rotation of the toothed sleeve will depend upon the ratio of the numbers of teeth of the second and further rotary components respectively.

The mechanisms illustrated in the drawings are diagrammatic, and as illustrated, the mechanism could not in fact be assembled. However, the drawings illustrate the principles of the mechanism and only detail designing work is required in order to produce a practical mechanism. For example, it may be necessary to provide two or more split-lines for the body 15 whereby the body may be separated to allow the assembly of the various rotary components and reciprocable members, the body part then being assembled and bolted together. Also, it will be appreciated that the cylinders 16–19 here merely serve as guides for the first and second reciprocable members 25 and 30. Other forms of guide could be provided. Equally, fluid-tight seals may be provided between the pistons and their respective bores, whereby the mechanism may serve as a pump, for example, with appropriate cylinder heads, valve-gear and so on.

I claim:
1. A mechanism for interconnecting a rotary component and at least one linearly reciprocable member, which mechanism comprises;
   a first rotary component including an external toothed surface;
   a second rotary component including an internally-toothed bore and an external eccentric surface off-centre with respect to the axis of the bore, the toothed surface of the first rotary component being rotatably received within said bore with the respective teeth meshed;
   a first reciprocable member having a bore in which is rotatably received the external eccentric surface; and
   means to constrain movement of the first reciprocable member along a linear path normal to an axis of the first rotary component.
2. A mechanism as claimed in claim 1 further comprising; an eccentricity of effective center of motion of the second rotary component about the first rotary component defined by the spacing between an axis of said first rotary component and the axis of said bore of the second rotary component, a throw defined by the eccentricity of said external eccentric surface, wherein the eccentricity of effective centre of motion of the second rotary component about the first rotary component is essentially the same as the throw of the further eccentric surface.
3. A mechanism as claimed in claim 1, wherein the external toothed surface comprises a circular surface concentric with the axis of the first rotary component, said externally toothed surface forming in conjunction with the bore of the second rotary component an eccentric mechanism having a throw of which is essentially the same as that of the eccentricity of the eccentric surface.
4. A mechanism as claimed in claim 3, wherein there is a further rotary component mounted for rotation about the axis of rotation of the first rotary component, the further rotary component having an external first eccentric surface arranged eccentrically with respect to the axis of rotation of the first rotary component, the bore in the second rotary component having a non-toothed portion in which is rotatably received the external first eccentric surface of the further rotary component, the eccentricity of the first eccentric surface of the further rotary component being essentially the same as the eccentricity of the epicyclic movement of the teeth of the second rotary component about the toothed surface of the first rotary component.
5. A mechanism as claimed in claim 4, wherein the further rotary component includes a shaft, and the first rotary component is rotatably mounted on said shaft.
6. A mechanism as claimed in claim 1, wherein the second rotary component has a second external eccentric surface of the same throw as that of the first eccentric surface but arranged 180° out-of-phase therewith, and there is a second reciprocable member having a bore in which is rotatably received the second external eccentric surface, and means to constrain movement of the second reciprocable member along a linear path mutually at right-angles to the axis of the first rotary component and to the linear path of movement of the first reciprocable member.

7. A mechanism as claimed in claim 6, wherein the means to constrain the first and second reciprocable members to move along their respective linear paths comprises a body in which said members are slidably supported.

8. A mechanism as claimed in claim 7, wherein each of the first and second reciprocable members defines a respective piston which is slidably mounted within an associated bore in the body.

9. A mechanism as claimed in claim 8, wherein each of the first and second reciprocable members defines a respective pair of pistons with the associated bore which receives the respective external eccentric surface, the bore being formed between the respective pair of pistons, the pair of pistons of each member being slidably mounted within associated aligned bores in the body.

10. A mechanism as claimed in claim 8, wherein each of the first and second reciprocable members is in the form of a pair of spaced pistons with a connecting web extending therebetween, the bore for the respective external eccentric surface being formed in the web.

11. A mechanism as claimed in claim 7, wherein the first rotary component includes a shaft which is rotatably mounted in the body.

12. A mechanism as claimed in claim 6, wherein the axes of linear movement of the first and second reciprocable members are spaced in the direction of the axis of the second rotary component.

* * * * *